US011012873B1

(12) United States Patent
Mondragon et al.

(10) Patent No.: US 11,012,873 B1
(45) Date of Patent: May 18, 2021

(54) SYSTEMS AND METHODS FOR UTILIZING TIME SERIES AND NEURAL NETWORK MODELS TO DEPLOY AUTONOMOUS VEHICLES FOR 5G NETWORK COVERAGE GAPS

(71) Applicant: Verizon Patent and Licensing Inc., Arlington, VA (US)

(72) Inventors: Diego Mondragon, Roswell, GA (US); John Gregory Bosque, Roswell, GA (US); Xinwei Zhi, Atlanta, GA (US); Seth Allyn Johnston, Canton, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/825,341

(22) Filed: Mar. 20, 2020

(51) Int. Cl.
*H04W 24/02* (2009.01)
*H04W 16/18* (2009.01)
*G06N 3/08* (2006.01)
*G06N 3/04* (2006.01)
*H04W 24/08* (2009.01)

(52) U.S. Cl.
CPC .......... *H04W 24/02* (2013.01); *G06N 3/0445* (2013.01); *G06N 3/08* (2013.01); *H04W 16/18* (2013.01); *H04W 24/08* (2013.01)

(58) Field of Classification Search
CPC ..... H04W 24/02; H04W 16/18; H04W 24/08; G06N 3/0445; G06N 3/08
See application file for complete search history.

(56) References Cited

U.S. PATENT DOCUMENTS

| 2011/0157106 | A1* | 6/2011 | Kim | G06F 3/1431 345/204 |
| 2012/0209652 | A1* | 8/2012 | Khosla | G06Q 10/0631 705/7.16 |
| 2017/0085417 | A1* | 3/2017 | O'Reirdan | H04L 41/0668 |
| 2018/0376525 | A1* | 12/2018 | Feng | H04L 27/0014 |
| 2019/0391582 | A1* | 12/2019 | Jung | B60W 60/0015 |
| 2020/0178090 | A1* | 6/2020 | Murphy | H04B 7/18502 |

* cited by examiner

*Primary Examiner* — Dinh Nguyen

(57) ABSTRACT

A device may receive historical usage data associated with a portion of a wireless network, and may train a model with the historical usage data to generate a trained model. The device may process data identifying a future time period, with the trained model, to forecast a traffic demand during the future time period, and may compare the traffic demand and a traffic capacity of the portion of the wireless network to determine whether the traffic demand is within a threshold of or exceeds the traffic capacity. The device may identify an autonomous vehicle to deploy for the portion of the wireless network when the traffic demand is within the threshold of or exceeds the traffic capacity, and may cause the autonomous vehicle to be deployed for the portion of the wireless network, wherein the autonomous vehicle is to provide a temporary wireless network.

20 Claims, 15 Drawing Sheets

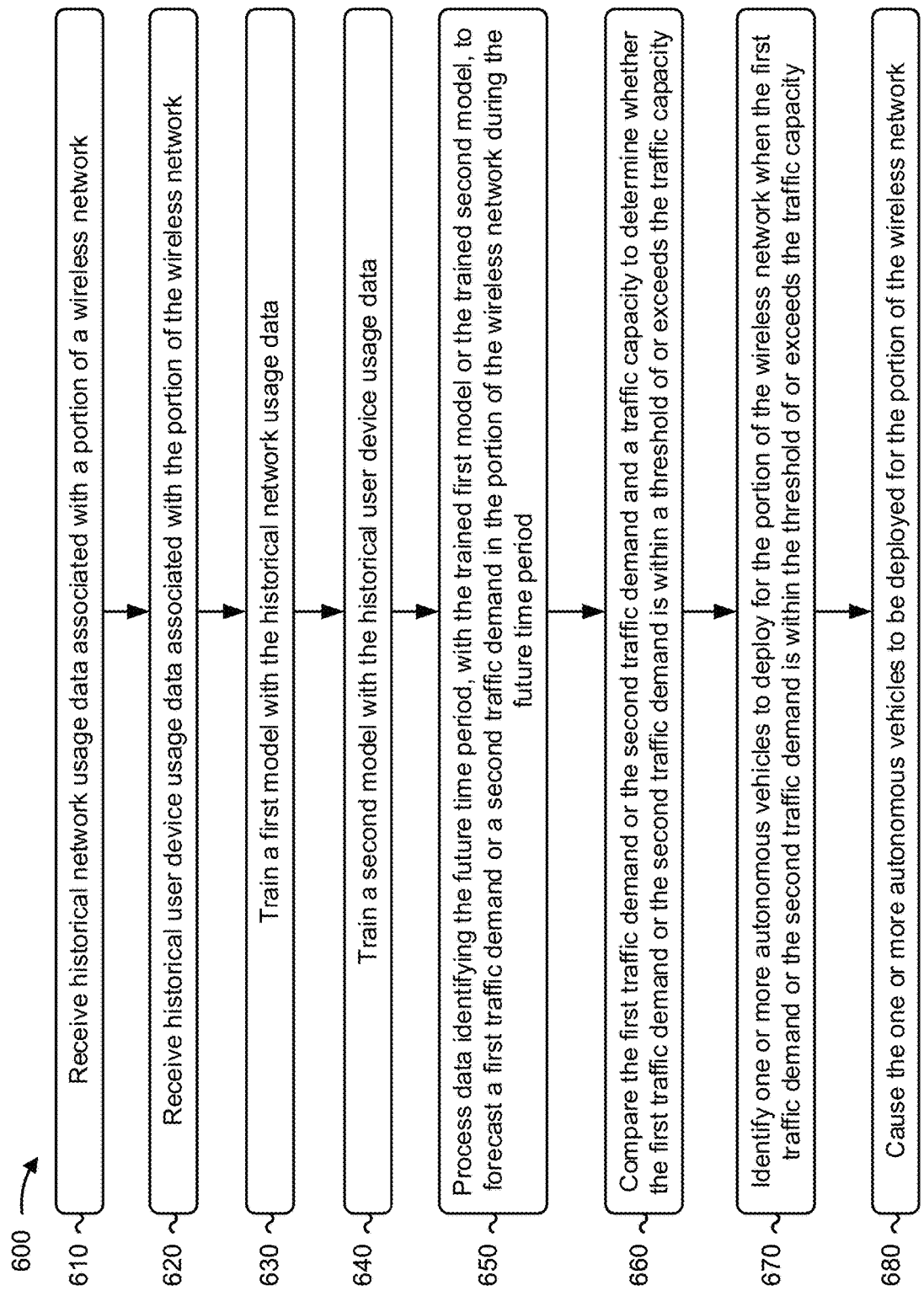

SYSTEMS AND METHODS FOR UTILIZING TIME SERIES AND NEURAL NETWORK MODELS TO DEPLOY AUTONOMOUS VEHICLES FOR 5G NETWORK COVERAGE GAPS

BACKGROUND

To provide coverage, especially between two (2) gigahertz (GHz) and thirty-nine (39) GHz and beyond, a fifth generation (5G) network requires a vast quantity of network antennas installed very close to one another. Such an installation is a time-consuming, costly, and complicated endeavor. Without this kind of antenna network, however, there will be gaps in 5G coverage.

BRIEF DESCRIPTION OF THE DRAWINGS

FIG. 6 is a flow chart of an example process for utilizing time series and neural network models to deploy autonomous vehicles for 5G network coverage gaps.

DETAILED DESCRIPTION OF PREFERRED EMBODIMENTS

Figure 1A:
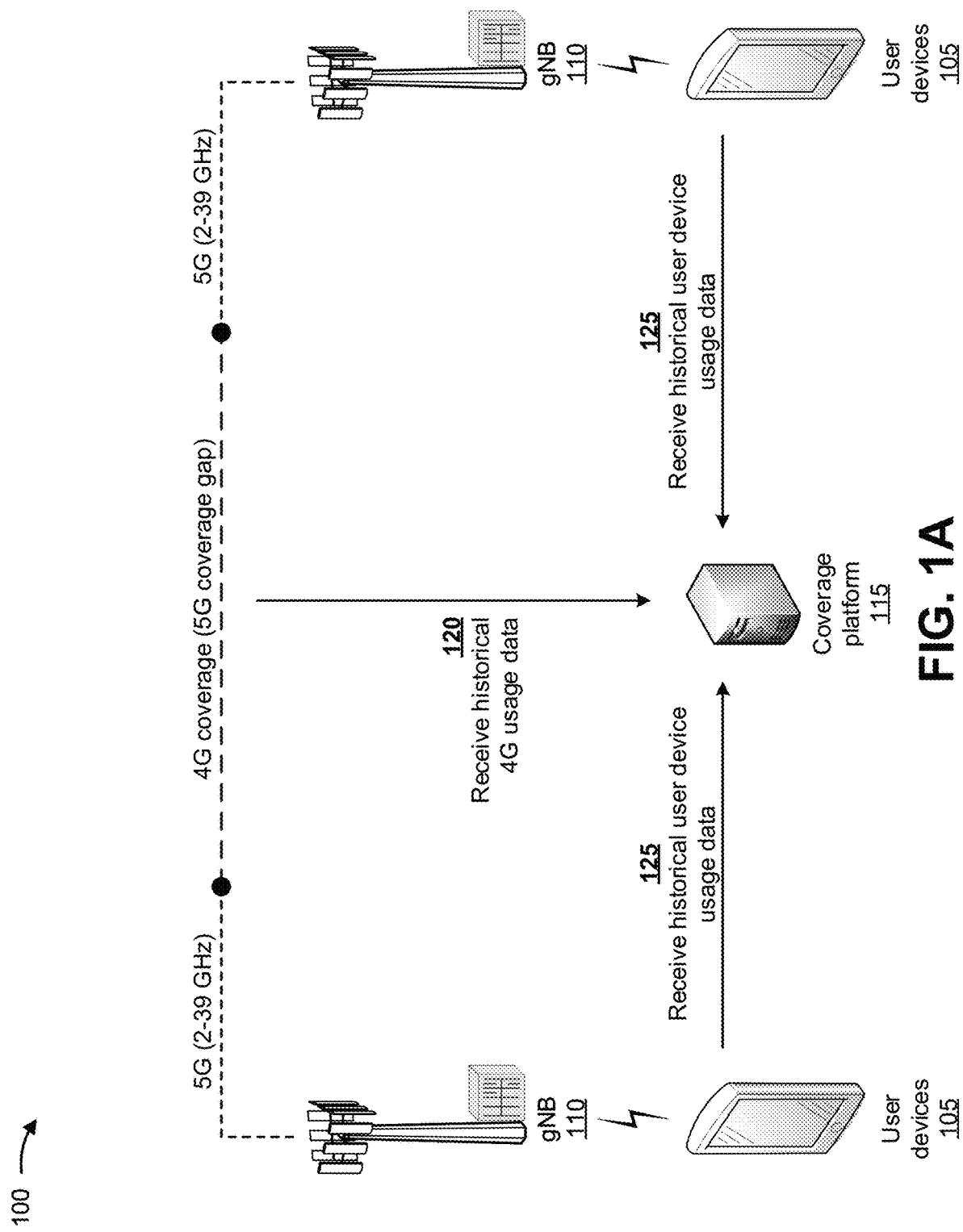
FIGS. 1A-1J are diagrams of one or more example implementations described herein.

The following detailed description of example implementations refers to the accompanying drawings. The same reference numbers in different drawings may identify the same or similar elements.

Currently, one of the biggest challenges in fourth generation (4G) long term evolution (LTE) networks is predicting network capacity and deploying infrastructure in a timely and cost-effective manner. For example, a 4G LTE network cannot handle data traffic at significant events (e.g., sporting events, concerts, music festivals and/or the like) where mobile device users actually consume more data to share their experience. This problem may not be easily solved even when 5G is ubiquitous. In fact, if not well handled, a user experience could be worse because of the unpredictable nature of significant events, rather than by a lack of system bandwidth. As users migrate to 5G networks, users become accustomed to new application experiences (e.g., augmented reality, virtual reality, high definition video, and/or the like) that consume significantly more data than the current norm. This makes data consumption prediction increasingly more difficult. Thus, current techniques for predicting data consumption and providing sufficient data capacity waste computing resources (e.g., processing resources, memory resources, communication resources, and/or the like), networking resources, and/or the like associated with incorrectly predicting data consumption, attempting to provide sufficient data capacity, providing poor user experiences, and/or the like.

Some implementations described herein provide a coverage platform for utilizing time series and neural network models to deploy autonomous vehicles for 5G network coverage gaps. For example, the coverage platform may receive historical network usage data associated with a portion of a wireless network, and may receive historical user device usage data associated with the portion of the wireless network. The coverage platform may train a first model with the historical network usage data to generate a trained first model that forecasts a first traffic demand in the portion of the wireless network during a future time period, and may train a second model with the historical user device usage data to generate a trained second model that forecasts a second traffic demand in the portion of the wireless network during the future time period.

The coverage platform may process data identifying the future time period, with one of the trained first model or the trained second model, to forecast one of the first traffic demand or the second traffic demand in the portion of the wireless network during the future time period. The coverage platform may compare the one of the first traffic demand or the second traffic demand and a traffic capacity of the portion of the wireless network to determine whether the one of the first traffic demand or the second traffic demand is within a threshold of or exceeds the traffic capacity. The coverage platform may identify one or more autonomous vehicles to deploy according to a determined schedule for the portion of the wireless network when the one of the first traffic demand or the second traffic demand is within the threshold of or exceeds the traffic capacity, and may cause the one or more autonomous vehicles to be deployed for the portion of the wireless network. The one or more autonomous vehicles may provide a temporary wireless network for the portion of the wireless network. Each of the one or more autonomous vehicles may be associated with a particular schedule determined based on historical need, the schedule indicating where the vehicles should autonomously relocate to at particular times.

In this way, the coverage platform utilizes time series and neural network models to deploy autonomous vehicles for 5G network coverage gaps. The coverage platform may cause autonomous and/or human-operated vehicles equipped with 5G network antennas to be deployed in order to dynamically close 5G coverage gaps based on data usage and traffic demand (e.g., peak commuting hours). For example, the coverage platform may cause autonomous vehicles to be deployed at geographical locations with the greatest bandwidth demands. Thus, the coverage platform conserves computing resources, networking resources, and/or the like that would otherwise be wasted in incorrectly predicting data consumption, attempting to provide sufficient data capacity, providing poor user experiences, and/or the like.

FIGS. 1A-1J are diagrams of one or more example implementations 100 described herein. As shown in FIG. 1A, user devices 105 may be associated with network devices (e.g., gNBs 110) associated with a 5G network and a coverage platform 115. User devices 105 may include mobile devices, computers, telephones, set-top boxes, and/or the like that the users may utilize to interact with and/or retrieve information from gNBs 110. gNBs 110 may provide 5G radio access networks (RANs) for portions of a wireless network. A remaining portion of the wireless network may be provided by one or more 4G RANs and may represent a 5G coverage gap in the wireless network. Coverage platform 115 may include a platform that utilizes time series and neural network models to deploy autonomous vehicles for 5G network coverage gaps, as described herein. In some implementations, one or more functions described herein as being performed by coverage platform 115 may be performed by one or more of autonomous vehicles that are deployed for the 5G network coverage gaps, as described herein.

As further shown in FIG. 1A, and by reference number 120, coverage platform 115 may receive historical 4G usage data. For example, coverage platform 115 may receive the historical 4G usage data for a portion of a wireless network (e.g., a portion of a 4G network). In some implementations, the historical network usage data includes data identifying geolocations of radio access network antennas (e.g., eNodeB (eNB) antennas) that provide the portion of the wireless network. Additionally, or alternatively, the historical network usage data may include hourly, daily, weekly, or monthly usage data associated with the portion of the wireless network; a data usage type associated with the portion of the wireless network; weather conditions associated with the portion of the wireless network; and/or the like.

As further shown in FIG. 1A, and by reference number 125, coverage platform 115 may receive historical user device usage data. For example, coverage platform 115 may receive historical user device usage data associated with portions of the wireless network. In some implementations, the historical user device usage data includes data identifying geolocations of user devices 105. Additionally, or alternatively, the historical user device usage data may include hourly, daily, weekly, or monthly usage data associated with user devices 105 for the portions of the wireless network; a data usage type associated with user devices 105; and/or the like. In some implementations, the historical user device usage data is associated with all user devices 105 associated with the portion of the wireless network, is associated with one or more events that cause abnormal usage of the wireless network (e.g., a football game, a baseball game, a concert, a parade, and/or the like).

Figure 1B:
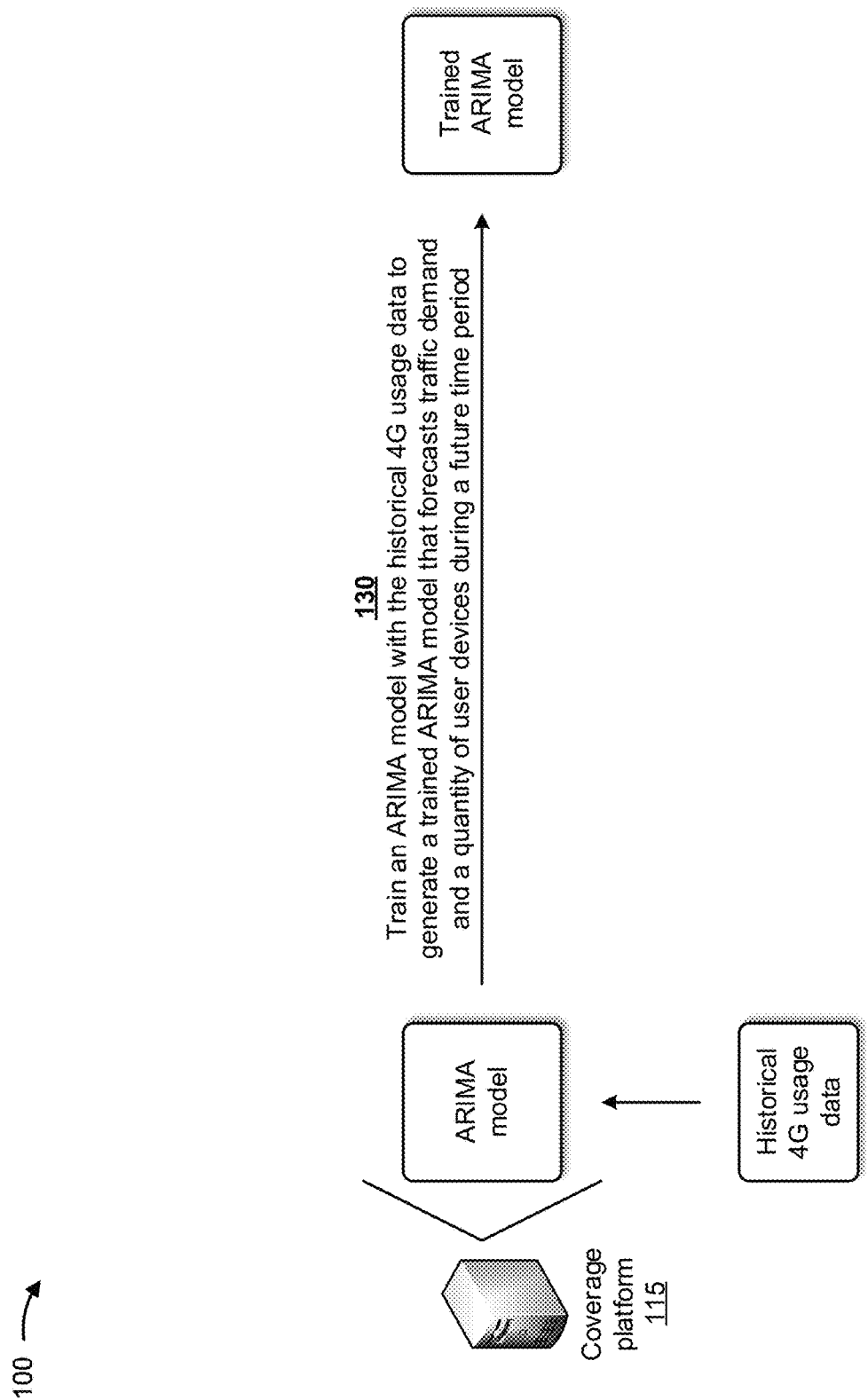

As shown in FIG. 1B, and by reference number 130, coverage platform 115 may train an auto regressive integrated moving average (ARIMA) model with the historical 4G usage data to generate a trained ARIMA model that forecasts traffic demand and a quantity of user devices 105 during a future time period. An ARIMA model is a class of models that explains a time series based on past values (e.g., lags and lagged forecast errors) so that the ARIMA model may be used to forecast future values. In some implementations, coverage platform 115 may train the ARIMA model with historical data (e.g., historical 4G usage data) to enable the ARIMA model to forecast the traffic demand and the quantity of user devices 105 during the future time period. For example, coverage platform 115 may train the ARIMA model in a manner similar to the manner described below in connection with FIG. 4. In some implementations, rather than training the ARIMA model, coverage platform 115 may obtain the ARIMA model from another system or device that trained the ARIMA model. In this case, coverage platform 115 may provide the other system or device with historical data for use in training the ARIMA model, and may provide the other system or device with updated historical data to retrain the ARIMA model in order to update the ARIMA model. Additionally, the coverage platform 115 may receive data regarding prescheduled events in order to forecast demand, such as dates and times of sporting or other types of events.

Figure 1C:
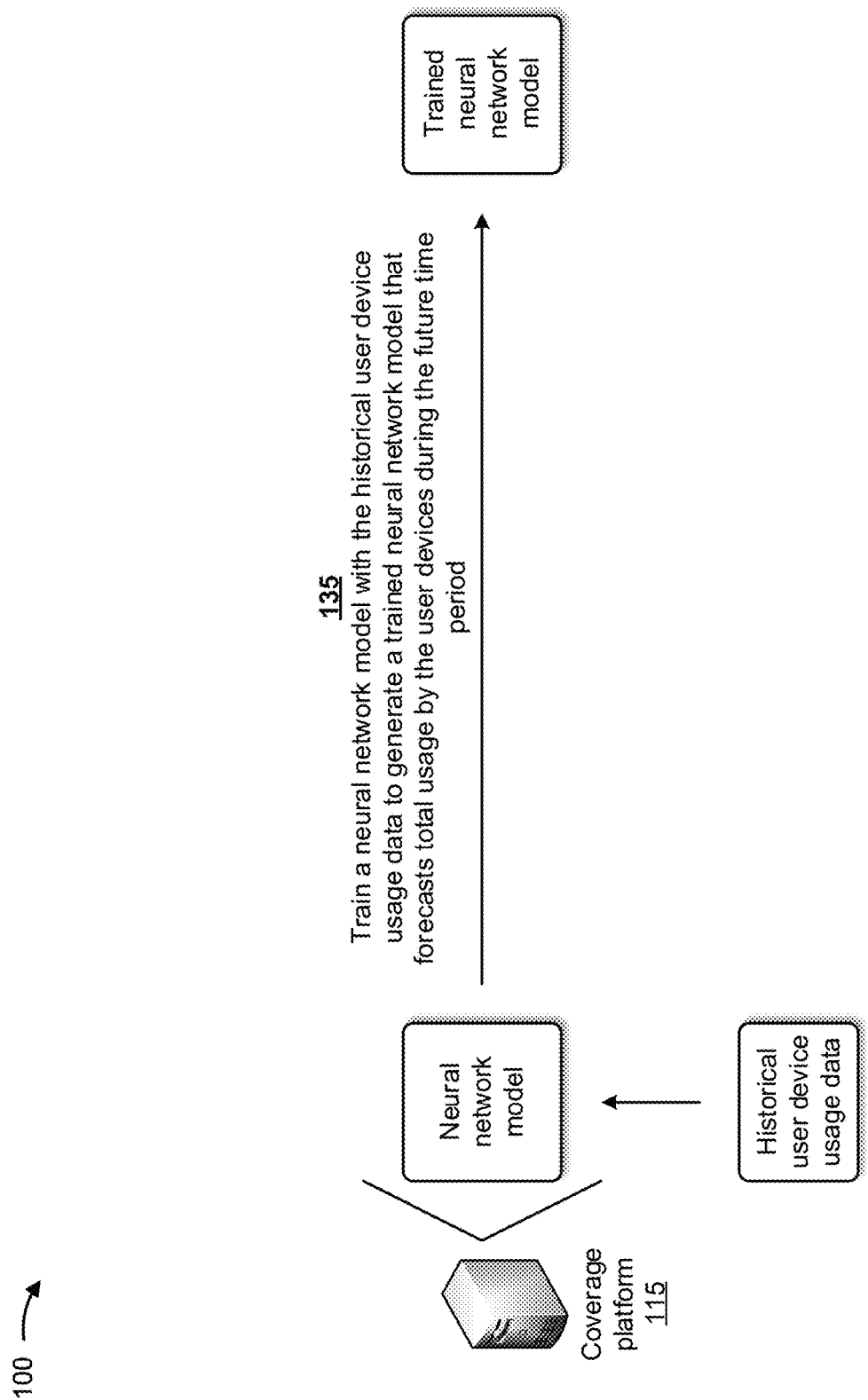

As shown in FIG. 1C, and by reference number 135, coverage platform 115 may train a neural network model with the historical user device usage data to generate a trained neural network model that forecasts total usage by user devices 105 during the future time period. In some implementations, the neural network model may include a recursive neural network (RNN). For example, the neural network model may include an RNN that includes a long short-term memory (LSTM) layer. In some implementations, coverage platform 115 may train the neural network model with historical data (e.g., historical user device usage data) to enable the neural network model to forecast the total usage by user devices 105 during the future time period. For example, coverage platform 115 may train the neural network model in a manner similar to the manner described below in connection with FIG. 4. In some implementations, rather than training the neural network model, coverage platform 115 may obtain the neural network model from another system or device that trained the neural network model. In this case, coverage platform 115 may provide the other system or device with historical data for use in training the neural network model, and may provide the other system or device with updated historical data to retrain the neural network model in order to update the neural network model.

Figure 1D:
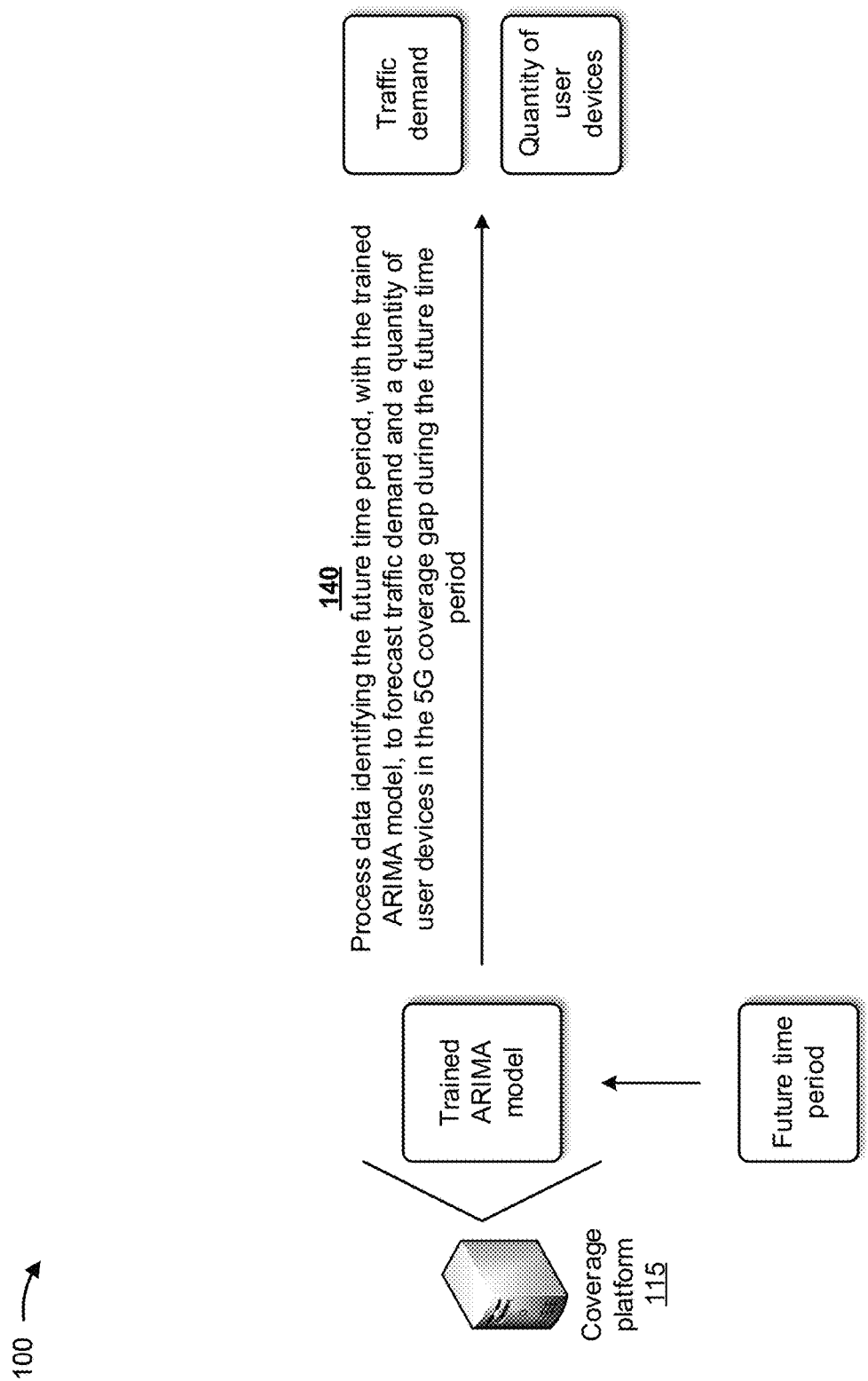

As shown in FIG. 1D, and by reference number 140, coverage platform 115 may process data identifying the future time period, with the trained ARIMA model, to forecast traffic demand and a quantity of user devices 105 in the 5G coverage gap during the future time period. In some implementations, coverage platform 115 may process the data identifying the future time period, with the trained ARIMA model, to predict traffic demand and a quantity of user devices 105 in the 5G coverage gap during one or more different future time periods. For example, coverage platform 115 may apply the trained ARIMA model to a new observation in a manner similar to the manner described below in connection with FIG. 5. The predicted traffic demand and the quantity of user devices 105 may be utilized by coverage platform 115 to determine whether to temporarily deploy autonomous vehicles with 5G coverage capabilities for the 5G coverage gap.

Figure 1E:
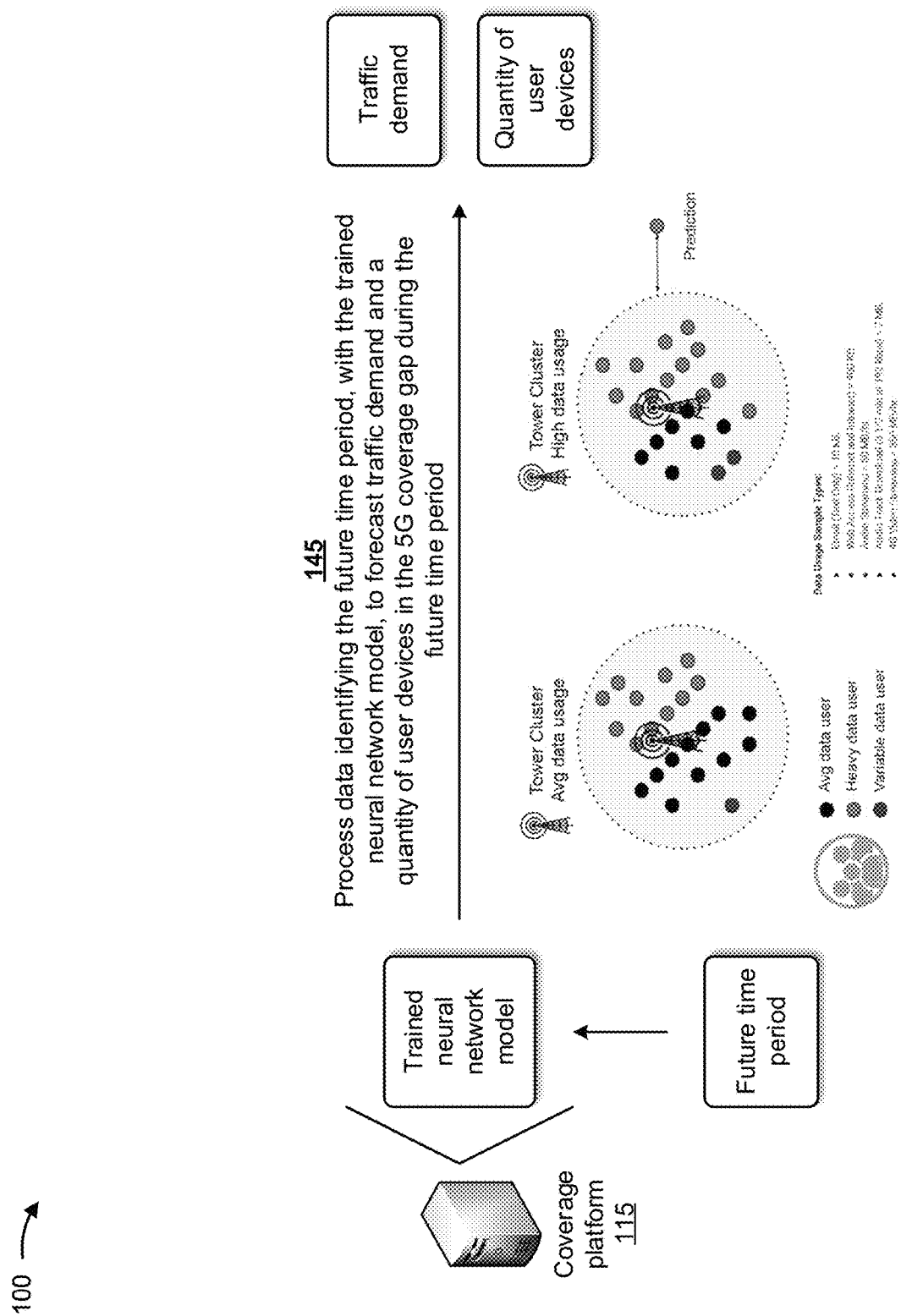

As shown in FIG. 1E, and by reference number 145, coverage platform 115 may process data identifying the future time period, with the trained neural network model, to forecast traffic demand and a quantity of user devices 105 in the 5G coverage gap during the future time period. For example, as further shown in FIG. 1E, a wireless network tower (e.g., gNB 110) with a cluster of a large quantity of user devices 105 that are heavy data users (e.g., video streamers) may have a higher data usage that a cluster of a smaller quantity of user devices 105 that are average data users. In some implementations, coverage platform 115 may apply the trained neural network model to a new observation in a manner similar to the manner described below in connection with FIG. 5. The predicted traffic demand and the quantity of user devices 105 may be utilized by coverage platform 115 to determine whether to temporarily deploy autonomous vehicles with 5G coverage capabilities for the 5G coverage gap.

Figure 1F:
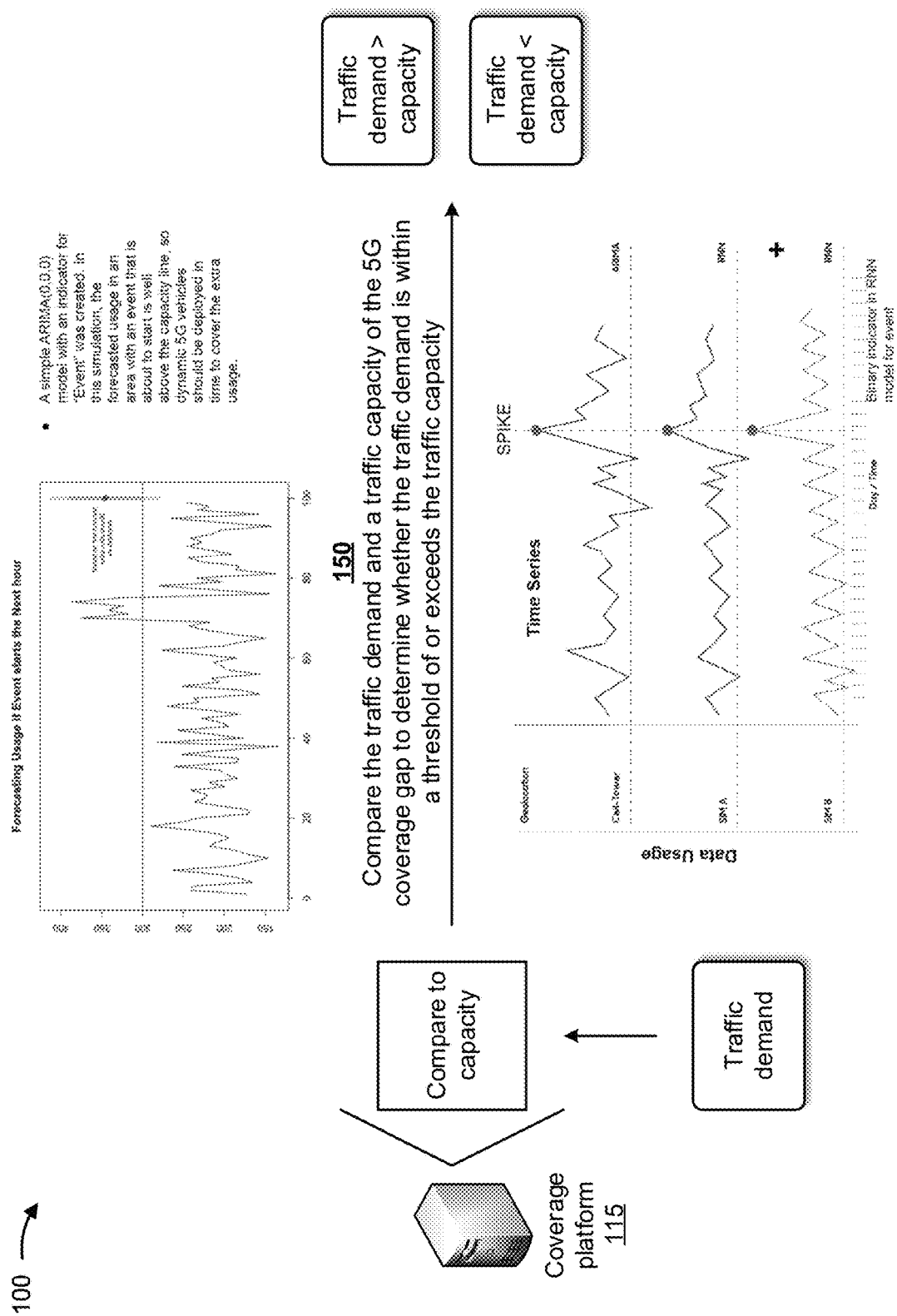

As shown in FIG. 1F, and by reference number 150, coverage platform 115 may compare the traffic demand and a traffic capacity of the 5G coverage gap to determine whether the traffic demand is within a threshold of or exceeds the traffic capacity. In some implementations, the threshold includes a capacity that is eighty, ninety, and/or the like percent of the traffic capacity. For example, as shown, coverage platform 115 may identify a spike on a particular day and time based on the prediction of the trained ARIMA model for a particular RAN of the wireless network and based on the predictions made by the trained neural network model for user devices 105 within range of the particular RAN. In some implementations, the spike may correspond to an event associated with high data usage. In this case, coverage platform 115 may determine that the traffic demand on the particular day and time exceeds the traffic capacity on the particular day and time.

Figure 1G:
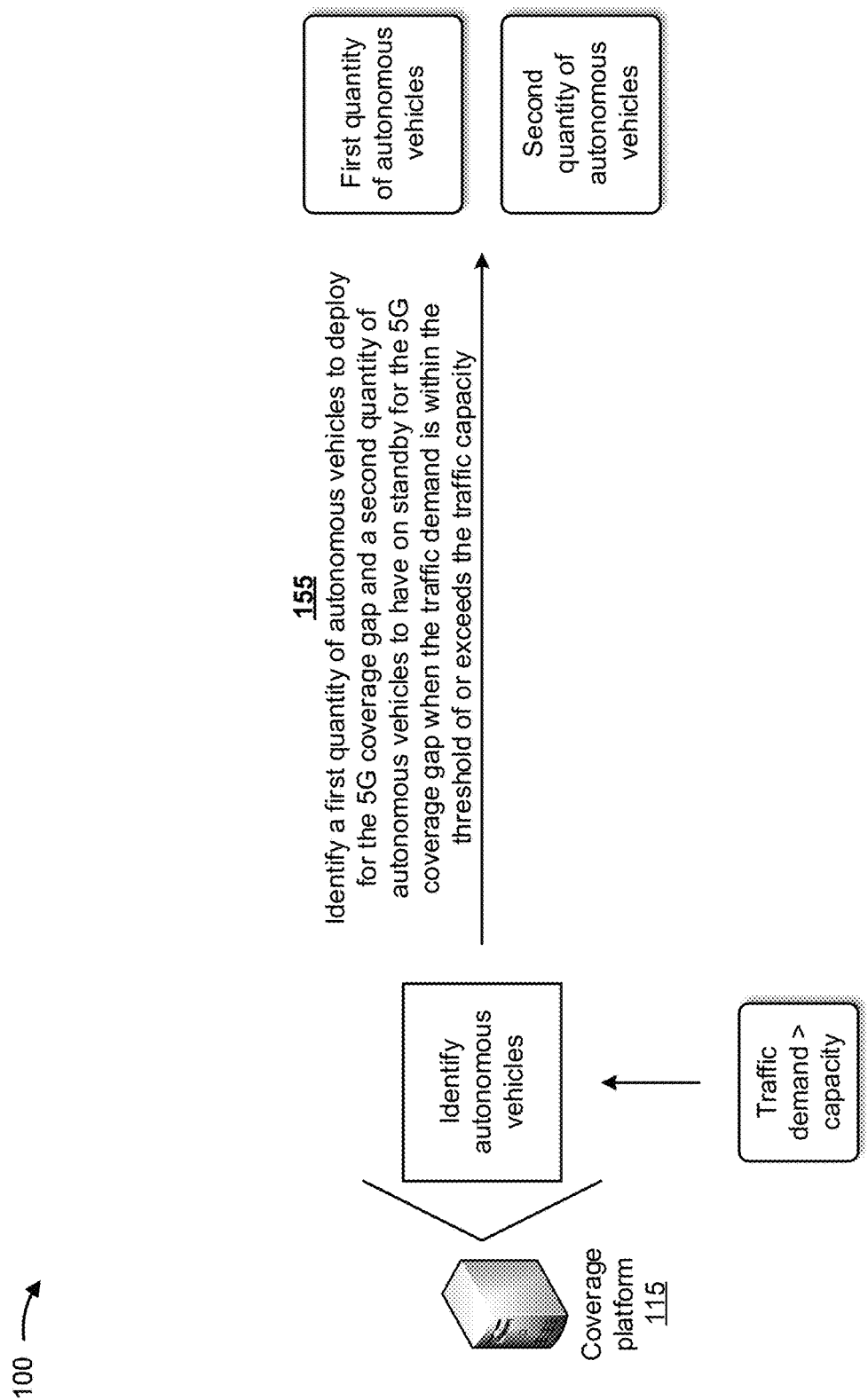

As shown in FIG. 1G, and by reference number 155, coverage platform 115 may identify a first quantity of autonomous vehicles to deploy for the 5G coverage gap and a second quantity of autonomous vehicles to have on standby for the 5G coverage gap when the traffic demand is within the threshold of or exceeds the traffic capacity. The first quantity of autonomous vehicles and/or the second quantity of autonomous vehicles may be provided with antennas that may provide a temporary wireless network (e.g., a temporary 5G network) for the portion of the wireless network. The first quantity of autonomous vehicles may be deployed to provide the temporary 5G network for the 5G coverage gap, and the second quantity of autonomous vehicles may be deployed in case one or more of the first quantity of autonomous vehicles are unable to provide the temporary 5G network, the traffic demand in the 5G coverage gap exceeds a traffic capacity provided by the first quantity of autonomous vehicles, and/or the like. In some implementations, one or more of the first quantity of autonomous vehicles and/or the second quantity of autonomous vehicles includes an autonomous automobile, an autonomous bus, an unmanned aerial vehicle, a robot, a public transportation vehicle (e.g., a bus, a train, a taxi, and/or the like), and/or the like, equipped with network capabilities.

In some implementations, coverage platform 115 utilizes the machine learning models described herein to predict data usage for the 5G coverage gap. Coverage platform 115 may deploy one or more autonomous vehicles for the 5G coverage gap and may have one or more autonomous vehicles on standby for the 5G coverage gap based on the predicted data usage.

Figure 1H:
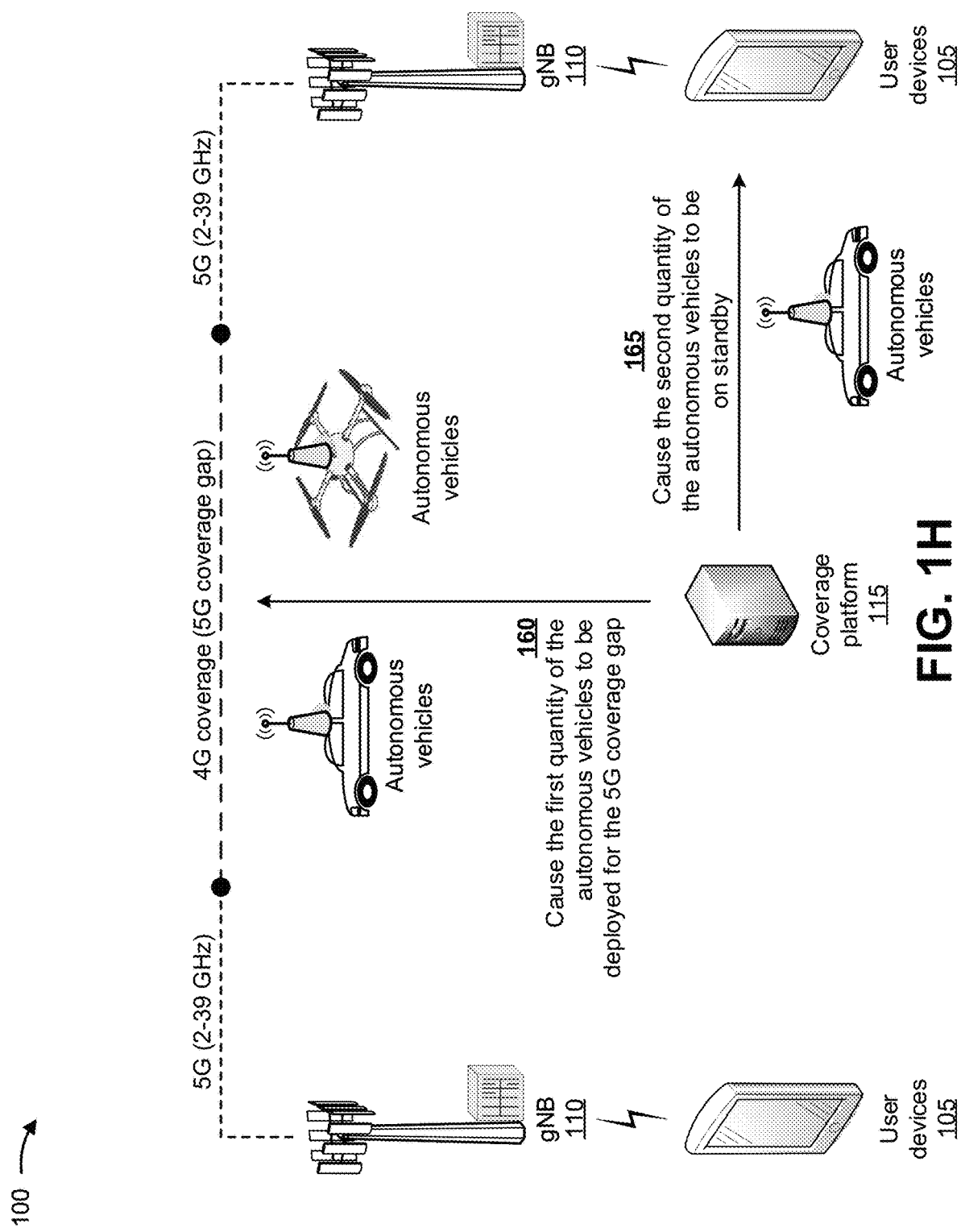

As shown in FIG. 1H, and by reference number 160, coverage platform 115 may cause the first quantity of the autonomous vehicles to be deployed for the 5G coverage gap. For example, coverage platform 115 may provide, to the first quantity of autonomous vehicles, navigation instructions to a destination associated with the 5G coverage gap. The instructions may cause the first quantity of autonomous vehicles to autonomously travel to the destination. In this way, coverage platform 115 may provide comprehensive 5G coverage between gNBs 110 (e.g., for communication with user devices 105) in order to close the 5G coverage gap. In some implementations, coverage platform 115 may cause the first quantity of the autonomous vehicles to travel away from a location associated with the portion of the wireless network after the future time period expires (e.g., when traffic demand in the 5G coverage gap is reduced below the traffic capacity of the 5G coverage gap). In some implementations, coverage platform 115 may cause the first quantity of the autonomous vehicles to travel to a location associated with a portion of a different wireless network after the future time period expires (e.g., to provide 5G coverage for a 5G coverage gap associated with the different wireless network).

As further shown in FIG. 1H, and by reference number 165, coverage platform 115 may cause the second quantity of the autonomous vehicles to be on standby at the location associated with the portion of the wireless network. For example, coverage platform 115 may instruct the second quantity of autonomous vehicles to be on standby (e.g., in case they need to be utilized for the 5G coverage gap), and the second quantity of autonomous vehicles cannot be utilized for another purpose until released from standby. In this way, coverage platform 115 may enable the second quantity of autonomous vehicles to be activated if needed to provide 5G coverage for the 5G coverage gap, while conserving resources that would otherwise have been wasted by deploying the second quantity of autonomous vehicles when the second quantity of autonomous vehicles are not needed to provide 5G coverage.

Figure 1I:
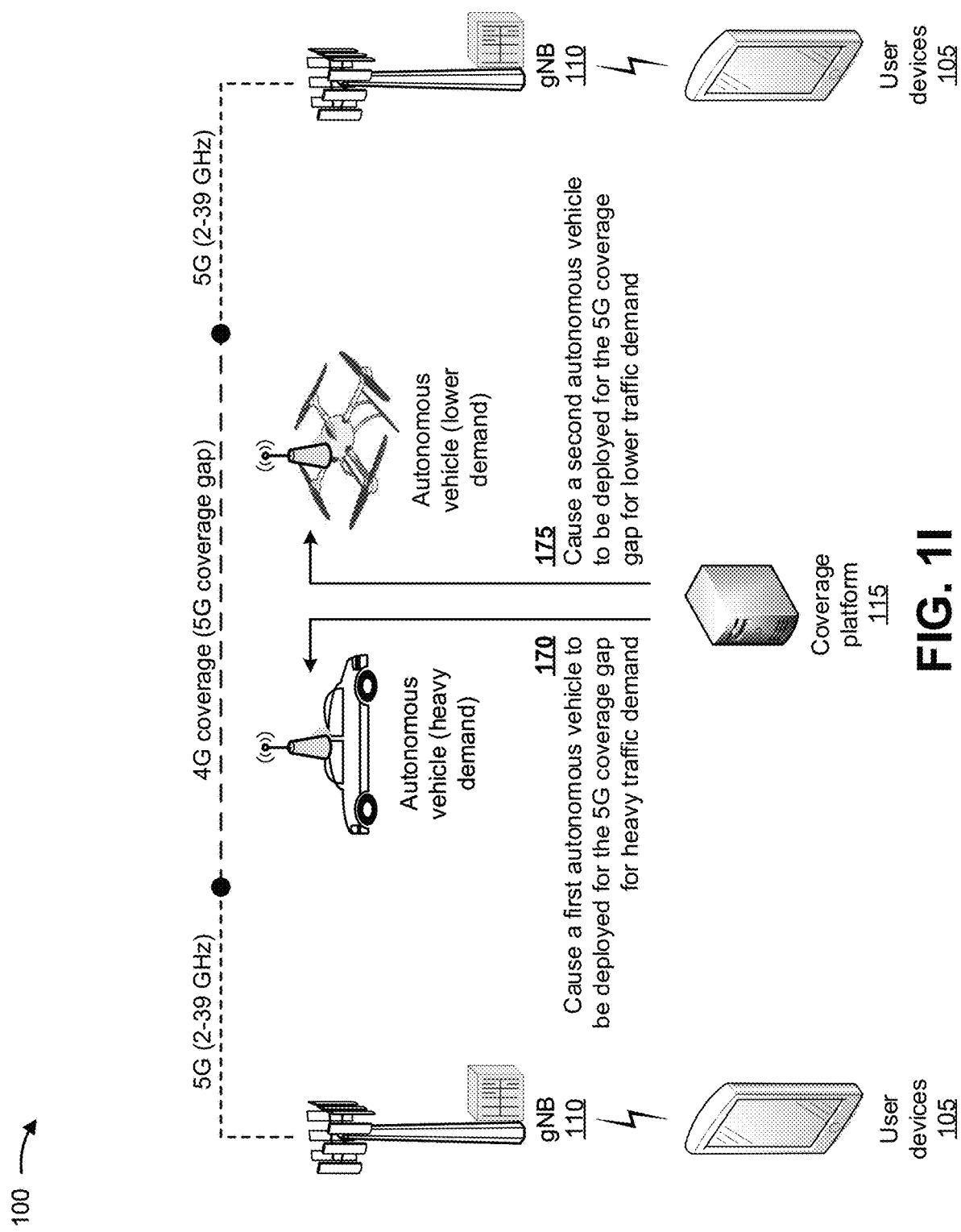

As shown in FIG. 1I, and by reference number 170, coverage platform 115 may cause a first autonomous vehicle to be deployed for the 5G coverage gap for heavy traffic demand. As further shown in FIG. 1I, and by reference number 175, coverage platform 115 may cause a second autonomous vehicle to be deployed for the 5G coverage gap for lower traffic demand. The first autonomous vehicle may be capable of handling a greater traffic demand than the second autonomous vehicle. In some implementations, the first autonomous vehicle may be a different type of vehicle than the second autonomous vehicle. For example, the first autonomous vehicle may be an autonomous automobile and the second autonomous vehicle may be an unmanned aerial vehicle, where the autonomous automobile may provide greater traffic capacity than the unmanned aerial vehicle (e.g., due to size differences between the autonomous automobile and the unmanned aerial vehicle).

In some implementations, coverage platform 115 may cause the first autonomous vehicle and/or the second autonomous vehicle to travel away from a location associated with the portion of the wireless network after a future time period expires (e.g., when traffic demand in the 5G coverage gap is reduced below the traffic capacity of the 5G coverage gap, or according to a predetermined schedule). In some implementations, coverage platform 115 may cause the first autonomous vehicle and/or the second autonomous vehicle to travel to a location associated with a portion of a different wireless network after the future time period expires (e.g., to provide 5G coverage for a 5G coverage gap associated with the different wireless network).

In some implementations, the second autonomous vehicle may be deployed instead of the first autonomous vehicle for the 5G coverage gap (e.g., when there is no heavy traffic demand). In this way, coverage platform 115 may efficiently provide sufficient coverage when traffic demand requires additional 5G coverage but not as much as the first autonomous vehicle provides. Additionally, or alternatively, the second autonomous vehicle may be deployed in addition to the first autonomous vehicle. In this way, coverage platform 115 may provide sufficient coverage when traffic demand requires additional coverage that exceeds what the first autonomous vehicle may provide. In some implementations, coverage platform 115 may provide any appropriate combination of autonomous vehicles capable of handling different ranges of traffic demands. In this way, coverage platform 115 may provide sufficient 5G coverage in the most efficient manner possible.

Figure 1J:
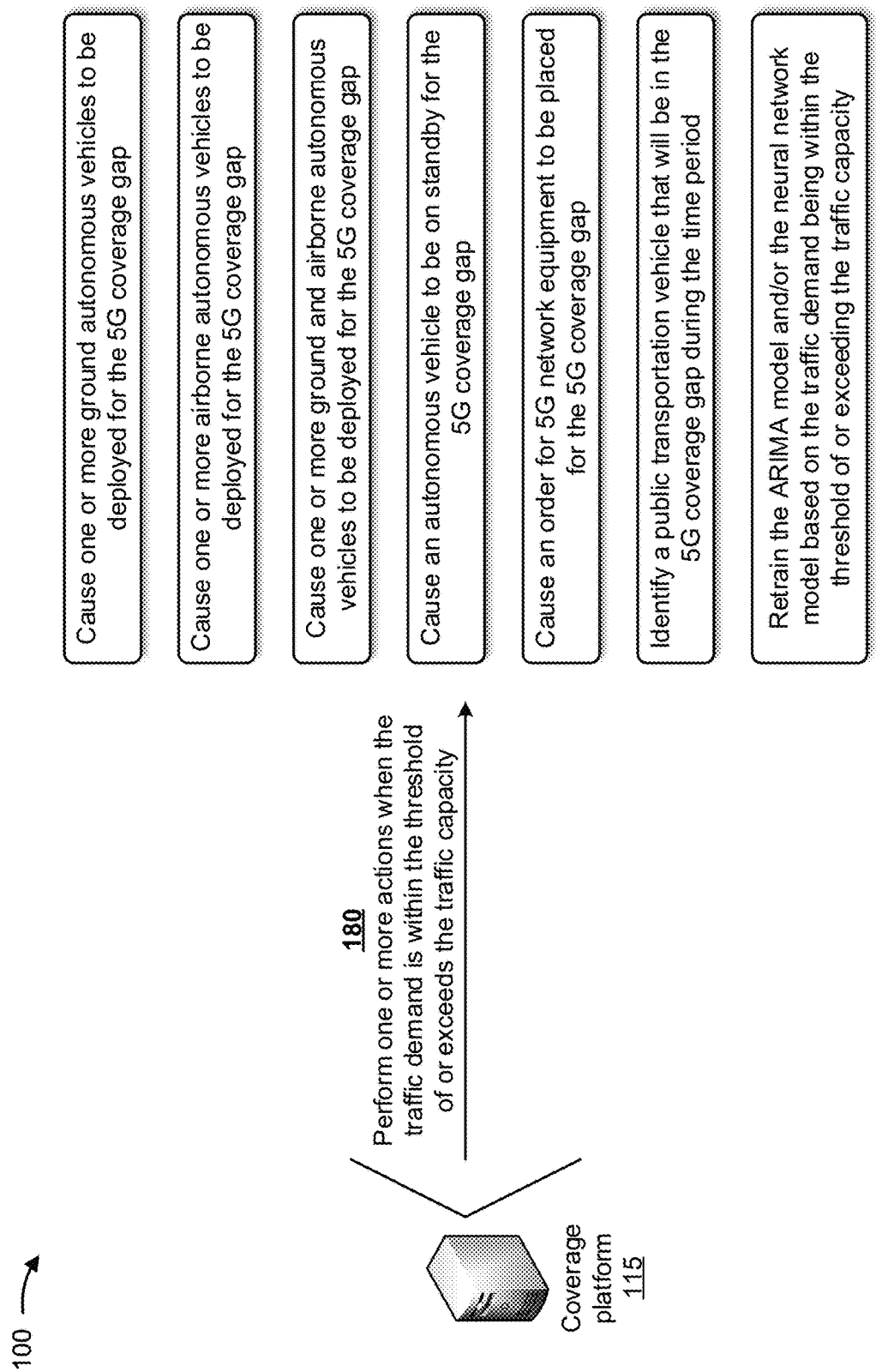

As shown in FIG. 1J, and by reference number 180, coverage platform 115 may perform one or more actions when the traffic demand is within the threshold of, or exceeds the traffic capacity. In some implementations, the one or more actions may include coverage platform 115 causing one or more ground autonomous vehicles to be deployed for the 5G coverage gap. For example, coverage platform 115 may cause an autonomous automobile (e.g., a car, a truck, a van, and/or the like) to be deployed for the 5G coverage gap. In this way, coverage platform 115 may utilize existing land routes and infrastructure to provide 5G coverage that automatically closes the 5G coverage gap, thereby conserving resources (e.g., computing resources, networking resources, and/or the like) that would otherwise have been wasted in dispatching base stations in a timely fashion, installing a quantity of base stations that would not be frequently utilized, and/or the like.

In some implementations, the one or more actions may include coverage platform 115 causing one or more airborne autonomous vehicles to be deployed for the 5G coverage gap. For example, coverage platform 115 may cause an unmanned aerial vehicle to be deployed for the 5G coverage gap. In this way, coverage platform 115 may provide 5G coverage at locations that may be restricted by automobile traffic, traffic controls, inaccessible roadways, unnavigable terrain, and/or the like, thereby conserving resources that would otherwise would have been wasted providing 5G coverage at the locations in a more expensive or more time-consuming manner (e.g., with larger and/or heavier vehicles, slower vehicles, less direct routes, and/or the like).

In some implementations, the one or more actions may include coverage platform 115 causing one or more ground and airborne autonomous vehicles to be deployed for the 5G coverage gap. For example, coverage platform 115 may cause a fleet of autonomous vehicles that includes one or more ground autonomous vehicles combined with one or more airborne autonomous vehicles, to be deployed for the 5G coverage gap. In this way, coverage platform 115 may utilize existing land routes and infrastructure to close the 5G coverage gap when it is most efficient to utilize ground autonomous vehicles, and may provide airborne autonomous vehicles to locations that are restricted by automobile traffic, traffic controls, inaccessible roadways, unnavigable terrain, and/or the like when it is most efficient to utilize airborne autonomous vehicles.

In some implementations, the one or more actions may include coverage platform 115 causing an autonomous vehicle to be on standby for the 5G coverage gap. For example, coverage platform 115 may identify an autonomous vehicle in the vicinity of the 5G coverage gap, may deploy the autonomous vehicle to a location in the vicinity of the 5G coverage gap, and may instruct the autonomous vehicle remain at the location until instructed otherwise. In this way, coverage platform 115 may enable an autonomous vehicle to be quickly and/or easily deployed when needed, while conserving resources if the autonomous vehicle is not needed, to close the 5G coverage gap.

In some implementations, the one or more actions may include coverage platform 115 causing an order for 5G network equipment to be placed for the 5G coverage gap. For example, coverage platform 115 may automatically invoke a provider of network equipment to deploy the network equipment (e.g., gNBs 110) in the 5G coverage gap. In this way, coverage platform 115 may automatically cause network equipment to be provided at locations that require the network equipment to close 5G coverage gaps.

In some implementations, the one or more actions may include coverage platform 115 identifying a public transportation vehicle that will be in the 5G coverage gap during the time period. For example, coverage platform 115 may identify a bus equipped with 5G capabilities that will be in a location of the 5G coverage gap during the time period, and/or may activate the 5G capabilities of the bus during the time period. In this way, coverage platform 115 may utilize existing public transportation vehicles to close the 5G coverage gap, thereby conserving resources that would otherwise have been wasted in deploying vehicles specifically for the purpose of closing the 5G coverage gap.

In some implementations, the one or more actions may include coverage platform 115 retraining the ARIMA model and/or the neural network model based on the traffic demand being within the threshold of or exceeding the traffic capacity. In this way, coverage platform 115 may improve the accuracy of the ARIMA model and/or the neural network model in forecasting traffic demand and a quantity of user devices in the 5G coverage gap during the future time period, which may improve speed and efficiency of the ARIMA model and/or the neural network model and conserve computing resources, networking resources, and/or the like.

In this way, several different stages of the process for deploying autonomous vehicles for 5G network coverage gaps are automated via time series and neural network models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes time series and neural network models to deploy autonomous vehicles for 5G network coverage gaps in the manner described herein. Finally, the process for utilizing time series and neural network models to deploy autonomous vehicles for 5G network coverage gaps conserves computing resources, networking resources, transportation resources, and/or the like that would otherwise be wasted in incorrectly predicting data consumption, attempting to provide sufficient data capacity, providing poor user experiences, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
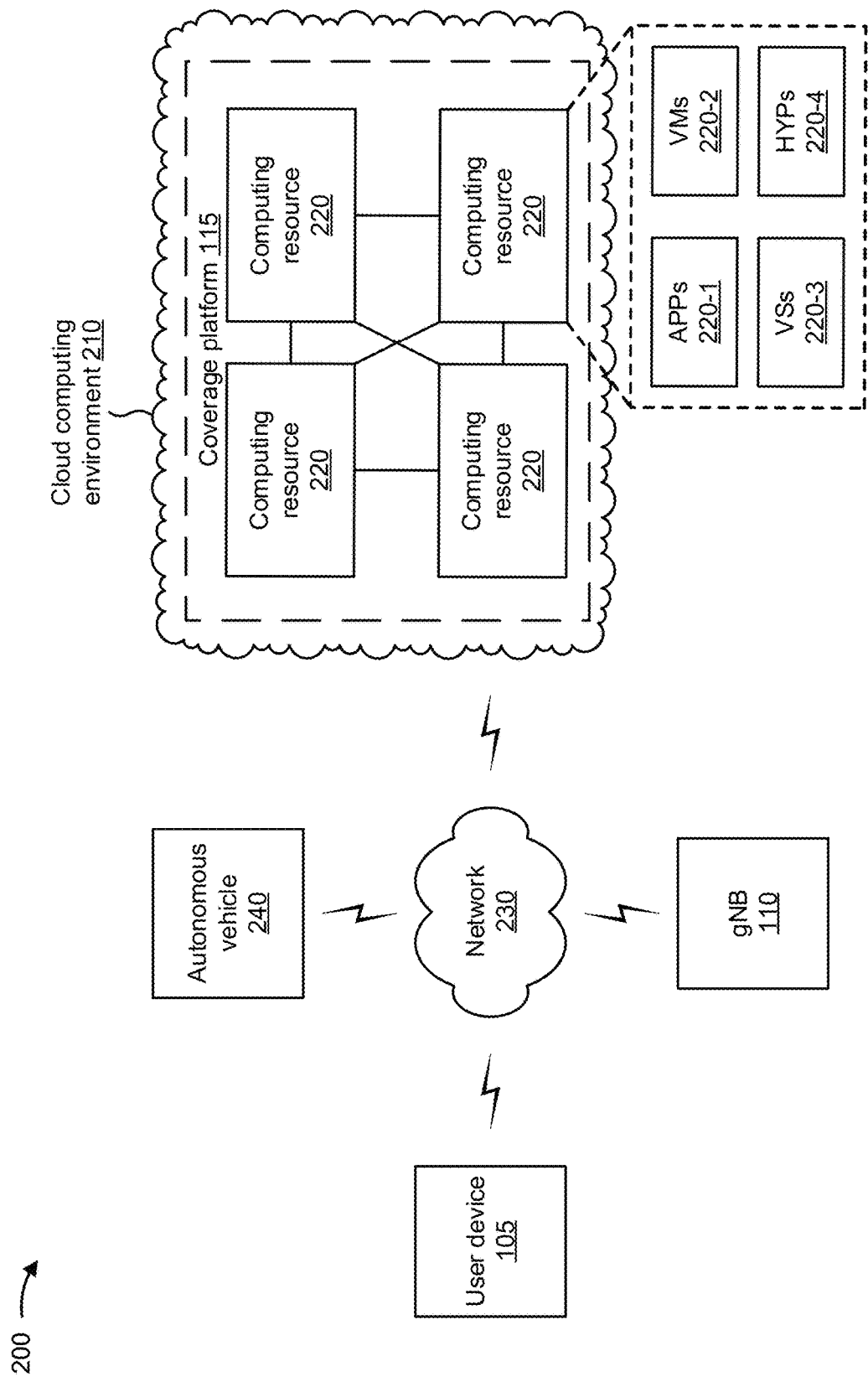
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, gNB 110, coverage platform 115, a network 230, and an autonomous vehicle 240. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to gNB 110, coverage platform 115, and/or autonomous vehicle 240.

gNB 110 includes one or more devices capable of receiving, generating, storing, processing, and/or providing information, as described herein. In some implementations, gNB 110 may be associated with a 5G network. In some implementations, gNB 110 may be replaced with an eNodeB (eNB) associated with a 4G network, a base station associated with another type of RAN, a small cell base station, such as a base station of a microcell, a picocell, and/or a femtocell, and/or the like. In some implementations, gNB 110 may communicate with and provide wireless access to one or more user devices 105. In some implementations, gNB 110 may receive information from and/or transmit information to user device 105, coverage platform 115, and/or autonomous vehicle 240.

Coverage platform 115 includes one or more devices that utilize time series and neural network models to deploy autonomous vehicles for 5G network coverage gaps. In some implementations, coverage platform 115 may be designed to be modular such that certain software components may be swapped in or out depending on a particular need. As such, coverage platform 115 may be easily and/or quickly reconfigured for different uses. In some implementations, coverage platform 115 may receive information from and/or transmit information to one or more user devices 105, gNBs 110, and/or autonomous vehicles 240.

In some implementations, as shown, coverage platform 115 may be hosted in a cloud computing environment 210. Notably, while implementations described herein describe coverage platform 115 as being hosted in cloud computing environment 210, in some implementations, coverage platform 115 may not be cloud-based (i.e., may be implemented outside of a cloud computing environment) or may be partially cloud-based.

Cloud computing environment 210 includes an environment that hosts coverage platform 115. Cloud computing environment 210 may provide computation, software, data access, storage, etc., services that do not require end-user knowledge of a physical location and configuration of system(s) and/or device(s) that host coverage platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host coverage platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with coverage platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of coverage platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to user device 105 and/or coverage platform 115.

Autonomous vehicle 240 includes one or more devices capable of receiving, generating, storing, processing, and/or providing information, as described herein. In some implementations, autonomous vehicle 240 may include an autonomous automobile, an autonomous bus, an unmanned aerial vehicle, a robot, and/or the like. In some implementations, autonomous vehicle 240 may be equipped with an antenna that communicates with and provides wireless access (e.g., to the 5G network) to one or more user devices 105. In some implementations, autonomous vehicle 240 may be replaced with a public transportation vehicle (e.g., a bus, a train, a taxi, and/or the like) that travels to particular locations based on a schedule and that is equipped with an antenna that communicates with and provides wireless access (e.g., to the 5G network) to one or more user devices 105.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
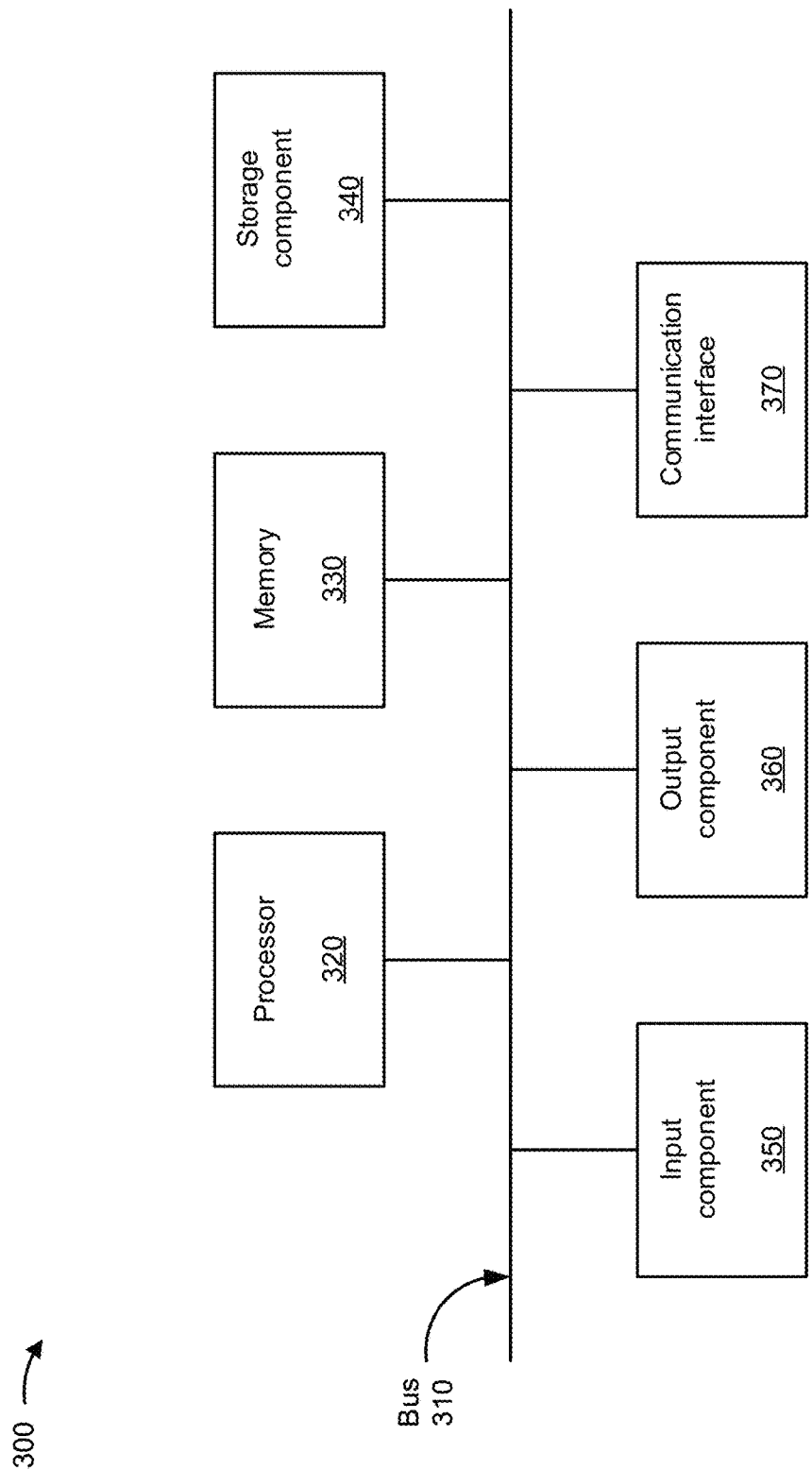
FIG. 3 is a diagram of example components of one or more devices of FIG. 2.

FIG. 3 is a diagram of example components of a device 300. Device 300 may correspond to user device 105, gNB 110, coverage platform 115, computing resource 220, and/or autonomous vehicle 240. In some implementations, user device 105, gNB 110, coverage platform 115, computing resource 220, and/or autonomous vehicle 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
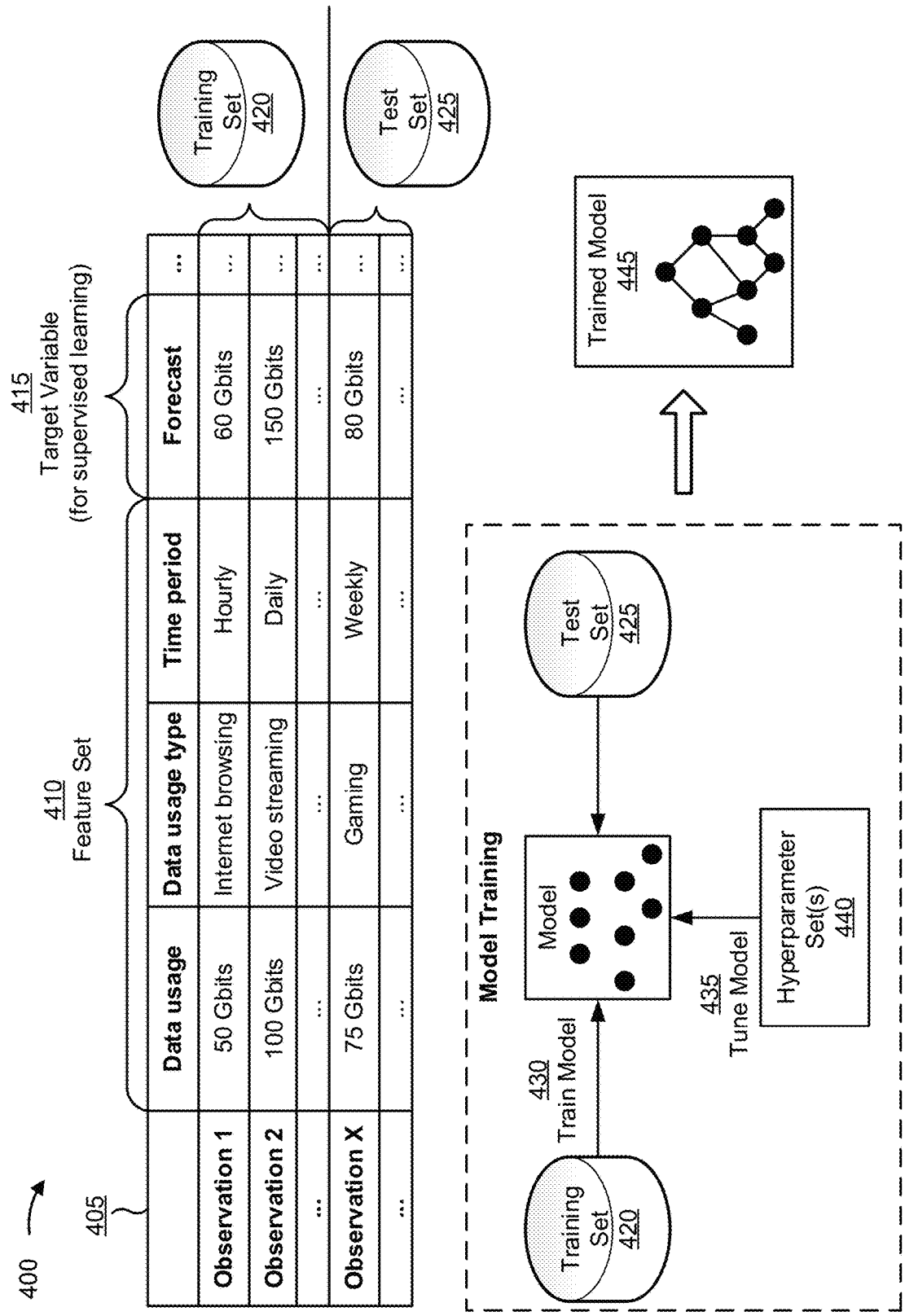
FIG. 4 is a diagram illustrating an example of training a machine learning model.

FIG. 4 is a diagram illustrating an example 400 of training a machine learning model. The machine learning model training described herein may be performed using a machine learning system. The machine learning system may include a computing device, a server, a cloud computing environment, and/or the like, such user device 105, coverage platform 115, and/or autonomous vehicle 240.

As shown by reference number 405, a machine learning model may be trained using a set of observations. The set of observations may be obtained and/or input from historical data, such as data gathered during one or more processes described herein. For example, the set of observations may include data gathered from user devices 105 and/or gNBs 110, as described elsewhere herein. In some implementations, the machine learning system may receive the set of observations (e.g., as input) from user devices 105 and/or gNBs 110.

As shown by reference number 410, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from user devices 105 and/or gNBs 110. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from user devices 105 and/or gNBs 110, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of data usage, a second feature of data usage type, a third feature of time period, and so on. As shown, for a first observation, the first feature may have a value of 50 gigabits (Gbits), the second feature may have a value of Internet browsing, the third feature may have a value of hourly, and so on. These features and feature values are provided as examples, and may differ in other examples. For example, the feature set may include one or more of the following features: fixed geolocations of gNBs 110; monthly, weekly, daily, and hourly data usage; data usage type (e.g., Internet browsing, augmented reality, video streaming, and/or the like); dates and times of data usage; major events data; dates and times of major events; mobile geolocations of user devices 105; thresholds of gNBs 300; and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 415, the set of observations may be associated with a target variable type (e.g., a forecast data usage). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the machine learning model, while the test set 425 may be used to evaluate a machine learning model that is trained using the training set 420. For example, for supervised learning, the test set 420 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used, based on randomly generating hyperparameter values, and/or the like). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups, based on randomly selecting a number of groups, and/or the like) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups.

For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, closest to a desired threshold, and/or the like) overall cross-validation score for training the machine learning model. The machine learning system may then train the machine learning model using the selected hyperparameter set 440, without cross-validation (e.g., using all of data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 445 to be used to analyze new observations, as described below in connection with FIG. 5.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 445.

As indicated above, FIG. 4 is provided as an example. Other examples may differ from what is described in connection with FIG. 4. For example, the machine learning model may be trained using a different process than what is described in connection with FIG. 4. Additionally, or alternatively, the machine learning model may employ a different machine learning algorithm than what is described in connection with FIG. 4, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 5:
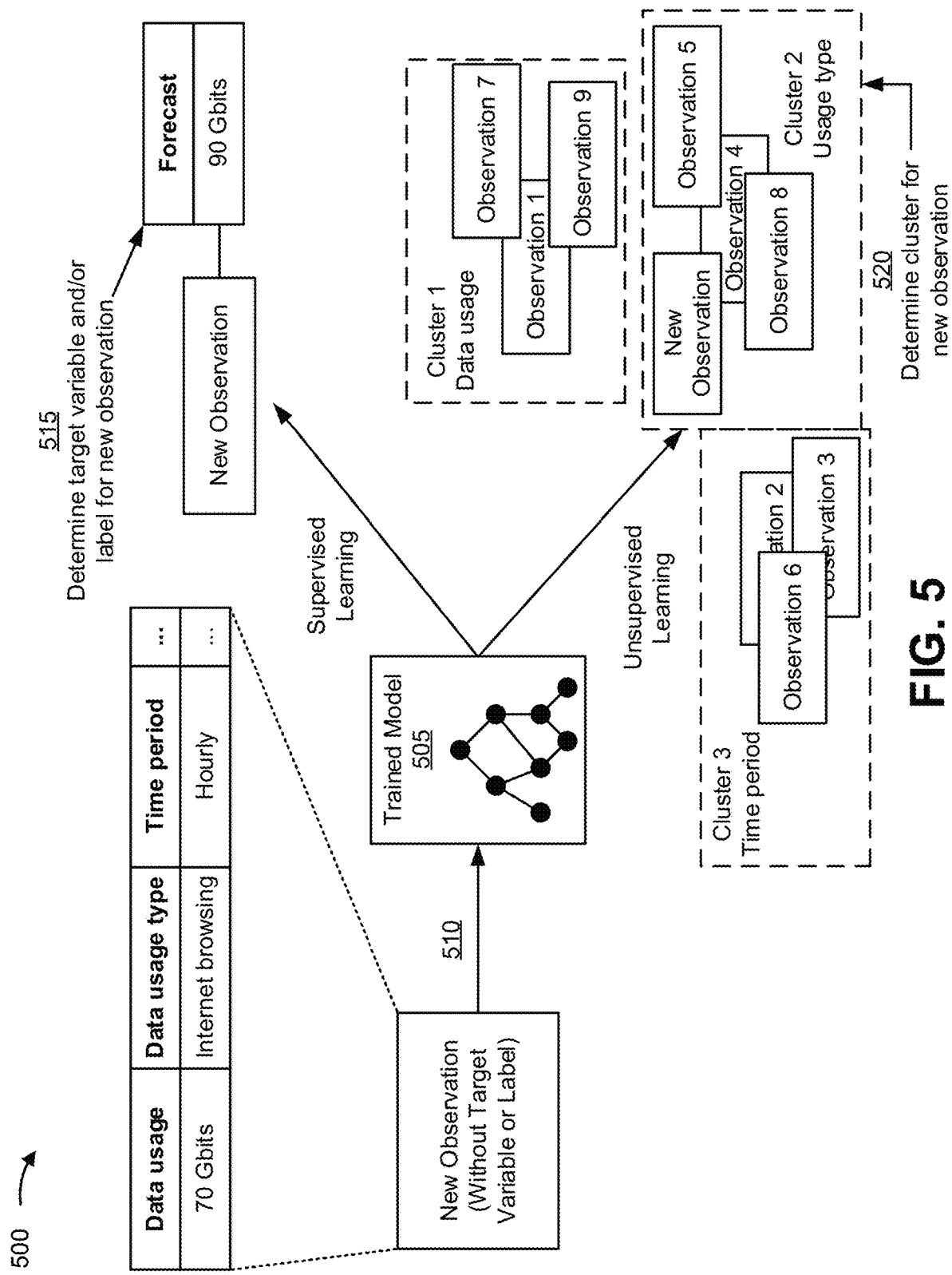
FIG. 5 is a diagram illustrating an example of applying a trained machine learning model to a new observation.

FIG. 5 is a diagram illustrating an example 500 of applying a trained machine learning model to a new observation. The new observation may be input to a machine learning system that stores a trained machine learning model 505. In some implementations, the trained machine learning model 505 may be the trained machine learning model 445 described above in connection with FIG. 4. The machine learning system may include a computing device, a server, a cloud computing environment, and/or the like, such as coverage platform 115 and/or autonomous vehicle 240.

As shown by reference number 510, the machine learning system may receive a new observation (or a set of new observations), and may input the new observation to the machine learning model 505. As shown, the new observation may include a first feature of data usage, a second feature of data usage type, a third feature of time period, and so on, as an example. The machine learning system may apply the trained machine learning model 505 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 505 may predict a value of 90 Gbits for the target variable of forecast for the new observation, as shown by reference number 515. Based on this prediction (e.g., based on the value having a particular label/classification, based on the value satisfying or failing to satisfy a threshold, and/or the like), the machine learning system may provide a recommendation, such as forecasted data usage for a 5G coverage gap. Additionally, or alternatively, the machine learning system may perform an automated action and/or may cause an automated action to be performed (e.g., by instructing another device to perform the automated action), such as instructing autonomous vehicle 240 to travel to a 5G coverage gap. As another example, if the machine learning system were to predict a value of 50 Gbits for the target variable of forecast, then the machine learning system may provide a different recommendation (e.g., have autonomous vehicle 240 on standby) and/or may perform or cause performance of a different automated action (e.g., instructing autonomous vehicle 240 to be on standby). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 505 may classify (e.g. cluster) the new observation in a data usage cluster, as shown by reference number 520. The observations within a cluster may have a threshold degree of similarity. Based on classifying the new observation in the data usage cluster, the machine learning system may provide a recommendation, such as dispatch autonomous vehicle 240. Additionally, or alternatively, the machine learning system may perform an automated action and/or may cause an automated action to be performed (e.g., by instructing another device to perform the automated action), such as instructing autonomous vehicle 240 to remain on standby. As another example, if the machine learning system were to classify the new observation in a usage type cluster, then the machine learning system may provide a different recommendation (e.g., dispatch a first autonomous vehicle 240 for high data usage and a second autonomous vehicle 240 for lower data usage) and/or may perform or cause performance of a different automated action (e.g., instructing the first autonomous vehicle 240 to travel to a first location and instructing the second autonomous vehicle 240 to travel to a second location).

In this way, the machine learning system may apply a rigorous and automated process to predict 5G coverage gaps during different time periods. The machine learning system enables recognition and/or identification of tens, hundreds, thousands, or millions of features and/or feature values for tens, hundreds, thousands, or millions of observations, thereby increasing an accuracy and consistency of predicting 5G coverage gaps during different time periods relative to requiring computing resources to be allocated for tens, hundreds, or thousands of operators to manually predict 5G coverage gaps during different time periods using the features or feature values.

As indicated above, FIG. 5 is provided as an example. Other examples may differ from what is described in connection with FIG. 5.

FIG. 6 is a flow chart of an example process 600 for utilizing time series and neural network models to deploy autonomous vehicles for 5G network coverage gaps. In some implementations, one or more process blocks of FIG. 6 may be performed by a device (e.g., coverage platform 115). In some implementations, one or more process blocks of FIG. 6 may be performed by another device or a group of devices separate from or including the device, such as a user device (e.g., user device 105) and/or an gNB (e.g., gNB 110).

As shown in FIG. 6, process 600 may include receiving historical network usage data associated with a portion of a wireless network (block 610). For example, the device (e.g., using computing resource 220, processor 320, communication interface 370, and/or the like) may receive historical network usage data associated with a portion of a wireless network, as described above. In some implementations, the historical network usage data may include data identifying a geolocation of a radio access network antenna that provides the portion of the wireless network, hourly, daily, weekly, or monthly usage data associated with the portion of the wireless network, a data usage type associated with the portion of the wireless network, or weather conditions associated with the portion of the wireless network.

As further shown in FIG. 6, process 600 may include receiving historical user device usage data associated with the portion of the wireless network (block 620). For example, the device (e.g., using computing resource 220, processor 320, communication interface 370, and/or the like) may receive historical user device usage data associated with the portion of the wireless network, as described above.

As further shown in FIG. 6, process 600 may include training a first model with the historical network usage data to generate a trained first model that forecasts a first traffic demand in the portion of the wireless network during a future time period (block 630). For example, the device (e.g., using computing resource 220, processor 320, memory 330, and/or the like) may train a first model with the historical network usage data to generate a trained first model that forecasts a first traffic demand in the portion of the wireless network during a future time period, as described above.

As further shown in FIG. 6, process 600 may include training a second model with the historical user device usage data to generate a trained second model that forecasts a second traffic demand in the portion of the wireless network during the future time period (block 640). For example, the device (e.g., using computing resource 220, processor 320, storage component 340, and/or the like) may train a second model with the historical user device usage data to generate a trained second model that forecasts a second traffic demand in the portion of the wireless network during the future time period, as described above. In some implementations, the first model may include an auto regressive integrated moving average (ARIMA) model, and the second model may include a neural network model.

As further shown in FIG. 6, process 600 may include processing data identifying the future time period, with one of the trained first model or the trained second model, to forecast one of the first traffic demand or the second traffic demand in the portion of the wireless network during the future time period (block 650). For example, the device (e.g., using computing resource 220, processor 320, memory 330, and/or the like) may process data identifying the future time period, with one of the trained first model or the trained second model, to forecast one of the first traffic demand or the second traffic demand in the portion of the wireless network during the future time period, as described above.

As further shown in FIG. 6, process 600 may include comparing the one of the first traffic demand or the second traffic demand and a traffic capacity of the portion of the wireless network to determine whether the one of the first traffic demand or the second traffic demand is within a threshold of or exceeds the traffic capacity (block 660). For example, the device (e.g., using computing resource 220, processor 320, storage component 340, and/or the like) may compare the one of the first traffic demand or the second traffic demand and a traffic capacity of the portion of the wireless network to determine whether the one of the first traffic demand or the second traffic demand is within a threshold of or exceeds the traffic capacity, as described above.

As further shown in FIG. 6, process 600 may include identifying one or more autonomous vehicles to deploy for the portion of the wireless network when the one of the first traffic demand or the second traffic demand is within the threshold of or exceeds the traffic capacity (block 670). For example, the device (e.g., using computing resource 220, processor 320, memory 330, storage component 340, and/or the like) may identify one or more autonomous vehicles to deploy for the portion of the wireless network when the one of the first traffic demand or the second traffic demand is within the threshold of or exceeds the traffic capacity, as described above. In some implementations, each of the one or more autonomous vehicles may include one of an autonomous automobile, an autonomous bus, an unmanned aerial vehicle, or a robot. In some implementations, the one or more autonomous vehicles may be provided with antennas that provide the temporary wireless network for the portion of the wireless network.

As further shown in FIG. 6, process 600 may include causing the one or more autonomous vehicles to be deployed for the portion of the wireless network, wherein the one or more autonomous vehicles are to provide a temporary wireless network for the portion of the wireless network (block 680). For example, the device (e.g., using computing resource 220, processor 320, memory 330, storage component 340, communication interface 370, and/or the like) may cause the one or more autonomous vehicles to be deployed for the portion of the wireless network, as described above. In some implementations, the one or more autonomous vehicles may provide a temporary wireless network for the portion of the wireless network. In some implementations, the portion of the wireless network may include a fourth generation (4G) network, and the temporary wireless network may include a fifth generation (5G) network.

In some implementations, identifying the one or more autonomous vehicles to deploy for the portion of the wireless network may include identifying a first quantity of autonomous vehicles to deploy for the portion of the wireless network and a second quantity of autonomous vehicles to have on standby for the portion of the wireless network when the one of the first traffic demand or the second traffic demand is within the threshold of or exceeds the traffic capacity; and causing the one or more autonomous vehicles to be deployed for the portion of the wireless network may include causing the first quantity of autonomous vehicles to be deployed for the portion of the wireless network.

In some implementations, identifying the one or more autonomous vehicles to deploy for the portion of the wireless network may include identifying a first autonomous vehicle and a second autonomous vehicle to deploy for the portion of the wireless network when the one of the first traffic demand or the second traffic demand is within the threshold of or exceeds the traffic capacity, the first autonomous vehicle is capable of handling a greater traffic demand than the second autonomous vehicle; and causing the one or more autonomous vehicles to be deployed for the portion of the wireless network may include causing the first autonomous vehicle and the second autonomous vehicle to be deployed for the portion of the wireless network.

Process 600 may include additional implementations, such as any single implementation or any combination of implementations described below and/or in connection with one or more other processes described elsewhere herein.

In some implementations, process 600 may include performing one or more actions when the one of the first traffic demand or the second traffic demand is within the threshold of or exceeds the traffic capacity. In some implementations, performing the one or more actions may include causing one or more ground autonomous vehicles to be deployed for the portion of the wireless network; causing one or more airborne autonomous vehicles to be deployed for the portion of the wireless network; causing at least one ground autonomous vehicle and at least one airborne autonomous vehicle to be deployed for the portion of the wireless network; causing an order for network equipment to be placed for the portion of the wireless network; identifying a public transportation vehicle that will be in a geographic location of the portion of the wireless network during the future time period, wherein the public transportation may vehicle include an antenna capable of providing the temporary wireless network; or retraining the first model or the second model after the future time period.

In some implementations, process 600 may include causing the one or more autonomous vehicles to travel away from a location associated with the portion of the wireless network after the future time period expires. In some implementations, process 600 may include causing the one or more autonomous vehicles to travel to a location associated with a portion of a different wireless network after the future time period expires.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, historical network usage data associated with a portion of a wireless network;
    receiving, by the device, historical user device usage data associated with the portion of the wireless network;
    training, by the device, a first model with the historical network usage data to generate a trained first model that forecasts a first traffic demand in the portion of the wireless network during a future time period;
    training, by the device, a second model with the historical user device usage data to generate a trained second model that forecasts a second traffic demand in the portion of the wireless network during the future time period;
    processing, by the device, data identifying the future time period, with one of the trained first model or the trained second model, to forecast one of the first traffic demand or the second traffic demand in the portion of the wireless network during the future time period;
    comparing, by the device, the one of the first traffic demand or the second traffic demand and a traffic capacity of the portion of the wireless network to determine whether the one of the first traffic demand or the second traffic demand is within a threshold of or exceeds the traffic capacity;
    identifying, by the device, one or more autonomous vehicles to deploy for the portion of the wireless network when the one of the first traffic demand or the second traffic demand is within the threshold of or exceeds the traffic capacity; and
    causing, by the device, the one or more autonomous vehicles to be deployed for the portion of the wireless network,
        wherein the one or more autonomous vehicles are to provide a temporary wireless network for the portion of the wireless network.

2. The method of claim 1, wherein:
    the first model includes an auto regressive integrated moving average (ARIMA) model, and
    the second model includes a neural network model.

3. The method of claim 1, wherein:
the portion of the wireless network includes a fourth generation (4G) network, and
the temporary wireless network includes a fifth generation (5G) network.

4. The method of claim 1, wherein:
identifying the one or more autonomous vehicles to deploy for the portion of the wireless network comprises:
identifying a first quantity of autonomous vehicles to deploy for the portion of the wireless network and a second quantity of autonomous vehicles to have on standby for the portion of the wireless network when the one of the first traffic demand or the second traffic demand is within the threshold of or exceeds the traffic capacity; and
causing the one or more autonomous vehicles to be deployed for the portion of the wireless network comprises:
causing the first quantity of autonomous vehicles to be deployed for the portion of the wireless network.

5. The method of claim 1, wherein:
identifying the one or more autonomous vehicles to deploy for the portion of the wireless network comprises:
identifying a first autonomous vehicle and a second autonomous vehicle to deploy for the portion of the wireless network when the one of the first traffic demand or the second traffic demand is within the threshold of or exceeds the traffic capacity,
wherein the first autonomous vehicle is capable of handling a greater traffic demand than the second autonomous vehicle; and
causing the one or more autonomous vehicles to be deployed for the portion of the wireless network comprises:
causing the first autonomous vehicle and the second autonomous vehicle to be deployed for the portion of the wireless network.

6. The method of claim 1, wherein each of the one or more autonomous vehicles includes one of:
an autonomous automobile,
an autonomous bus,
an unmanned aerial vehicle, or
a robot.

7. The method of claim 1, wherein the one or more autonomous vehicles are provided with antennas that provide the temporary wireless network for the portion of the wireless network.

8. A device, comprising:
one or more memories; and
one or more processors, communicatively coupled to the one or more memories, configured to:
process data identifying a future time period, with one of a first model or a second model, to forecast one of a first traffic demand or a second traffic demand in a portion of a wireless network during the future time period,
wherein the first model is trained with historical network usage data associated with the portion of the wireless network to forecast the first traffic demand,
wherein the second model is trained with historical user device usage data associated with the portion of the wireless network to forecast the second traffic demand;
compare the one of the first traffic demand or the second traffic demand and a traffic capacity of the portion of the wireless network to determine whether the one of the first traffic demand or the second traffic demand is within a threshold of or exceeds the traffic capacity;
identify one or more autonomous vehicles to deploy for the portion of the wireless network when the one of the first traffic demand or the second traffic demand is within the threshold of or exceeds the traffic capacity; and
cause the one or more autonomous vehicles to be deployed for the portion of the wireless network,
wherein the one or more autonomous vehicles are to provide a temporary wireless network for the portion of the wireless network.

9. The device of claim 8, wherein the one or more processors are further configured to:
perform one or more actions when the one of the first traffic demand or the second traffic demand is within the threshold of or exceeds the traffic capacity.

10. The device of claim 9, wherein the one or more processors, when performing the one or more actions, are configured to one or more of:
cause one or more ground autonomous vehicles to be deployed for the portion of the wireless network; or
cause one or more airborne autonomous vehicles to be deployed for the portion of the wireless network.

11. The device of claim 9, wherein the one or more processors, when performing the one or more actions, are configured to one or more of:
cause an order for network equipment to be placed for the portion of the wireless network;
identify a public transportation vehicle that will be in a geographic location of the portion of the wireless network during the future time period,
wherein the public transportation vehicle includes an antenna capable of providing the temporary wireless network; or
retrain the first model or the second model after the future time period.

12. The device of claim 8, wherein the one or more processors are further configured to:
cause the one or more autonomous vehicles to travel away from a location associated with the portion of the wireless network after the future time period expires.

13. The device of claim 8, wherein the one or more processors are further configured to:
cause the one or more autonomous vehicles to travel to a location associated with a portion of a different wireless network after the future time period expires.

14. The device of claim 8, wherein the historical network usage data includes data identifying one or more of:
a geolocation of a radio access network antenna that provides the portion of the wireless network,
hourly, daily, weekly, or monthly usage data associated with the portion of the wireless network,
a data usage type associated with the portion of the wireless network, or
weather conditions associated with the portion of the wireless network.

15. A non-transitory computer-readable medium storing instructions, the instructions comprising:
one or more instructions that, when executed by one or more processors, cause the one or more processors to:
process data identifying a future time period, with one of a first model or a second model, to forecast one of a first traffic demand or a second traffic demand in a portion of a wireless network during the future time period,
> wherein the first model is trained with historical network usage data associated with the portion of the wireless network to forecast the first traffic demand, and
> wherein the second model is trained with historical user device usage data associated with the portion of the wireless network to forecast the second traffic demand;

compare the one of the first traffic demand or the second traffic demand and a traffic capacity of the portion of the wireless network to determine whether the one of the first traffic demand or the second traffic demand is within a threshold of or exceeds the traffic capacity;

identify one or more autonomous vehicles to deploy for the portion of the wireless network when the one of the first traffic demand or the second traffic demand is within the threshold of or exceeds the traffic capacity; and cause the one or more autonomous vehicles to be deployed for the portion of the wireless network,
> wherein the one or more autonomous vehicles are to provide a temporary wireless network for the portion of the wireless network.

16. The non-transitory computer-readable medium of claim 15, wherein:
the first model includes an auto regressive integrated moving average (ARIMA) model, or
the second model includes a neural network model.

17. The non-transitory computer-readable medium of claim 15, wherein the one or more instructions, when executed by the one or more processors, further cause the one or more processors to:
determine a schedule for the portion of the wireless network;
deploy a first quantity of autonomous vehicles according to the schedule; and
cause a second quantity of autonomous vehicles to be on standby according to the schedule.

18. The non-transitory computer-readable medium of claim 15, wherein the one or more instructions, that cause the one or more processors to cause the one or more autonomous vehicles to be deployed for the portion of the wireless network, cause the one or more processors to:
deploy one or more ground autonomous vehicles according to a schedule;
deploy one or more airborne autonomous vehicles according to the schedule; or
deploy at least one ground autonomous vehicle and at least one airborne autonomous vehicle according to the schedule.

19. The non-transitory computer-readable medium of claim 15, wherein the one or more instructions, when executed by the one or more processors, further cause the one or more processors to one or more of:
cause an order for network equipment to be placed based on the traffic demand; or
identify a public transportation vehicle that will be in a location associated with the portion of the wireless network according to a schedule,
> wherein the public transportation vehicle includes an antenna capable of providing a temporary wireless network.

20. The non-transitory computer-readable medium of claim 15, wherein the one or more instructions, when executed by the one or more processors, further cause the one or more processors to:
cause the one or more autonomous vehicles to travel away from a location associated with the portion of the wireless network after a future time period expires.

* * * * *